(12) United States Patent
Momose et al.

(10) Patent No.: US 11,704,521 B2
(45) Date of Patent: Jul. 18, 2023

(54) IMAGE FORMING APPARATUS, IMAGE FORMING METHOD, AND IMAGE FORMING PROGRAM

(71) Applicant: KONICA MINOLTA, INC., Tokyo (JP)

(72) Inventors: Atsumi Momose, Hino (JP); Toshiyuki Mizutani, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/865,568

(22) Filed: Jul. 15, 2022

(65) Prior Publication Data
US 2023/0054669 A1 Feb. 23, 2023

(30) Foreign Application Priority Data
Aug. 19, 2021 (JP) ................. 2021-134300

(51) Int. Cl.
*G06K 15/02* (2006.01)
*G06K 15/10* (2006.01)
*B41J 2/205* (2006.01)

(52) U.S. Cl.
CPC ........ *G06K 15/1881* (2013.01); *B41J 2/2054* (2013.01); *G06K 15/102* (2013.01)

(58) Field of Classification Search
CPC .. G06K 15/1881; G06K 15/102; B41J 2/2054
See application file for complete search history.

(56) References Cited

U.S. PATENT DOCUMENTS

| 7,701,614 B2 * | 4/2010 | Yamazaki | ............ | H04N 1/4052 |
| | | | | 358/1.9 |
| 2014/0139854 A1 * | 5/2014 | Saito | ................... | H04N 1/4015 |
| | | | | 358/1.9 |

FOREIGN PATENT DOCUMENTS

JP 2008155382 A 7/2008

* cited by examiner

*Primary Examiner* — Quang N Vo
(74) *Attorney, Agent, or Firm* — Buchanan Ingersoll & Rooney PC

(57) ABSTRACT

An image forming apparatus includes: a nozzle head in which nozzles that ejects ink is arranged in a first direction; a moving mechanism that moves a recording medium relative to the nozzle head; an image acquirer that acquires image data; a quantization processor that quantizes density of pixels forming an image based on the image data; a grouping processor that groups adjacent pixel positions into one group in the quantized data; and a rearrangement processor that rearranges a quantized pixel value at each pixel position in the group that is grouped, wherein the grouping processor groups such that a direction intersecting the first direction is set to a second direction, arrangement of groups in the first direction is set to a row, rows is arranged in the second direction, and a row in which an initial position of the row is different at least by one pixel is included.

20 Claims, 11 Drawing Sheets

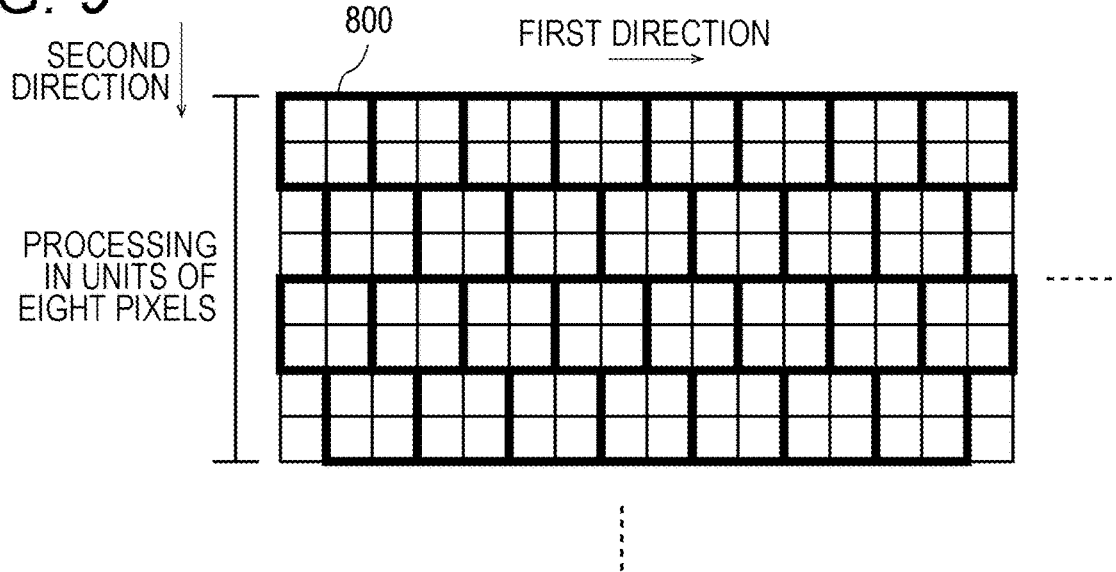

FIG. 11

FIRST DIRECTION →

SECOND DIRECTION ↓

|  | | | | |
|---|---|---|---|---|
| c1→ | 1 | 2 | 2 | 2 |
| c2→ | 0 | 3 | 3 | 4 |
| c3→ | 1 | 1 | 0 | 2 | 0 |
| c4→ | 1 | 2 | 2 | 3 | 1 |

FIRST DIRECTION →

SECOND DIRECTION ↓

| | | | | | | | |
|---|---|---|---|---|---|---|---|
| c1→ | 0 | 1 | 2 | 0 | 0 | 2 | 2 | 0 |
| c2→ | 0 | 0 | 1 | 2 | 2 | 1 | 2 | 2 |
| c3→ | 1 | 0 | 1 | 0 | 0 | 0 | 1 | 1 |
| c4→ | 1 | 0 | 2 | 0 | 2 | 1 | 2 | 1 |

FIRST DIRECTION →

SECOND DIRECTION ↓

| | | | | |
|---|---|---|---|---|
| c1→ | NO | NO | YES | YES |
| c2→ | NO | YES | YES | NO |
| c3→ | YES | NO | NO | |
| c4→ | YES | NO | YES | |

FIG. 14

FIRST DIRECTION →

SECOND DIRECTION ↓

| 0 | 1 | 3 | 2 |
|---|---|---|---|
|  | 3 | 0 | 1 |

# IMAGE FORMING APPARATUS, IMAGE FORMING METHOD, AND IMAGE FORMING PROGRAM

The entire disclosure of Japanese patent Application No. 2021-134300, filed on Aug. 19, 2021, is incorporated herein by reference in its entirety.

BACKGROUND

Technological Field

The present invention relates to an image forming apparatus, an image forming method, and an image forming program.

Description of the Related Art

In general, an inkjet type image forming apparatus uses a nozzle head in which a plurality of nozzle rows is arranged in parallel to each other, the nozzle row in which a plurality of nozzles is arranged in a row. The nozzle head moves relative to paper. A direction in which the nozzle rows are arranged in the nozzle head is a direction intersecting a moving direction of the paper in a single pass type, and is a direction in which the nozzle head moves in a scan type.

In such nozzle head, in order to increase recording density of dots formed on a recording medium (paper), a plurality of nozzles is alternately arranged so as not to overlap each other as seen from the moving direction of the paper or a head moving direction.

In a case where such nozzle head is mounted in an inclined manner for some reason, a pitch of the dots formed on the paper is not constant, and variation in image density occurs in one image. Such variation in image density might cause image failure. For example, JP 2008-155382 A discloses a countermeasure against the image failure due to the density variation. The technology disclosed in JP 2008-155382 A reduces the image failure due to the density variation by providing a sub nozzle row in addition to a main nozzle row, and ejecting ink from a sub nozzle in case where an inclination of the nozzle head is equal to or greater than a predetermined inclination amount.

However, the technology disclosed in JP 2008-155382 A has a problem that a size of the nozzle head is increased and a cost is also increased.

SUMMARY

The present invention is achieved in view of the above-described problems. Therefore, an object of the present invention is to provide an image forming apparatus, an image forming method, and an image forming program that prevent or reduce the variation in image density due to the inclination of the nozzle head without increasing the size of the nozzle head.

To achieve the abovementioned object, according to an aspect of the present invention, an image forming apparatus reflecting one aspect of the present invention comprises: a nozzle head in which a plurality of nozzles that ejects ink is arranged in a first direction; a moving mechanism that moves a recording medium relative to the nozzle head; an image acquirer that acquires image data; a quantization processor that quantizes density of pixels forming an image on a basis of the image data; a grouping processor that groups a plurality of adjacent pixel positions into one group in the data that is quantized; and a rearrangement processor that rearranges a quantized pixel value at each pixel position in the group that is grouped, wherein the grouping processor groups such that a direction intersecting the first direction is set to a second direction, arrangement of a plurality of groups in the first direction is set to a row, a plurality of rows is arranged in the second direction, and a row in which an initial position of the row is different at least by one pixel is included.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a schematic diagram illustrating a result of the halftone processing and rearrangement processing;

FIG. 8 is a schematic diagram illustrating a result of the halftone processing and rearrangement processing;

FIG. 9 is a schematic diagram illustrating a result of the halftone processing and rearrangement processing;

FIG. 10 is a schematic diagram illustrating a result of the halftone processing and rearrangement processing;

FIG. 11 is a schematic diagram illustrating a result of the halftone processing and rearrangement processing;

FIG. 12 is a schematic diagram illustrating a result of the halftone processing and rearrangement processing;

FIG. 13 is a schematic diagram illustrating an example of a rearrangement pattern;

FIG. 14 is a schematic diagram illustrating another example of the rearrangement pattern;

DETAILED DESCRIPTION OF EMBODIMENTS

Hereinafter, one or more embodiments of the present invention will be described with reference to the drawings. However, the scope of the invention is not limited to the disclosed embodiments. Note that, in the description of the drawings, the same elements are assigned with the same reference signs, and the description thereof is not repeated. Dimensional ratios of the drawings are exaggerated for convenience of illustration and might differ from actual ratios.

<Image Forming Apparatus 100>

Figure 1:
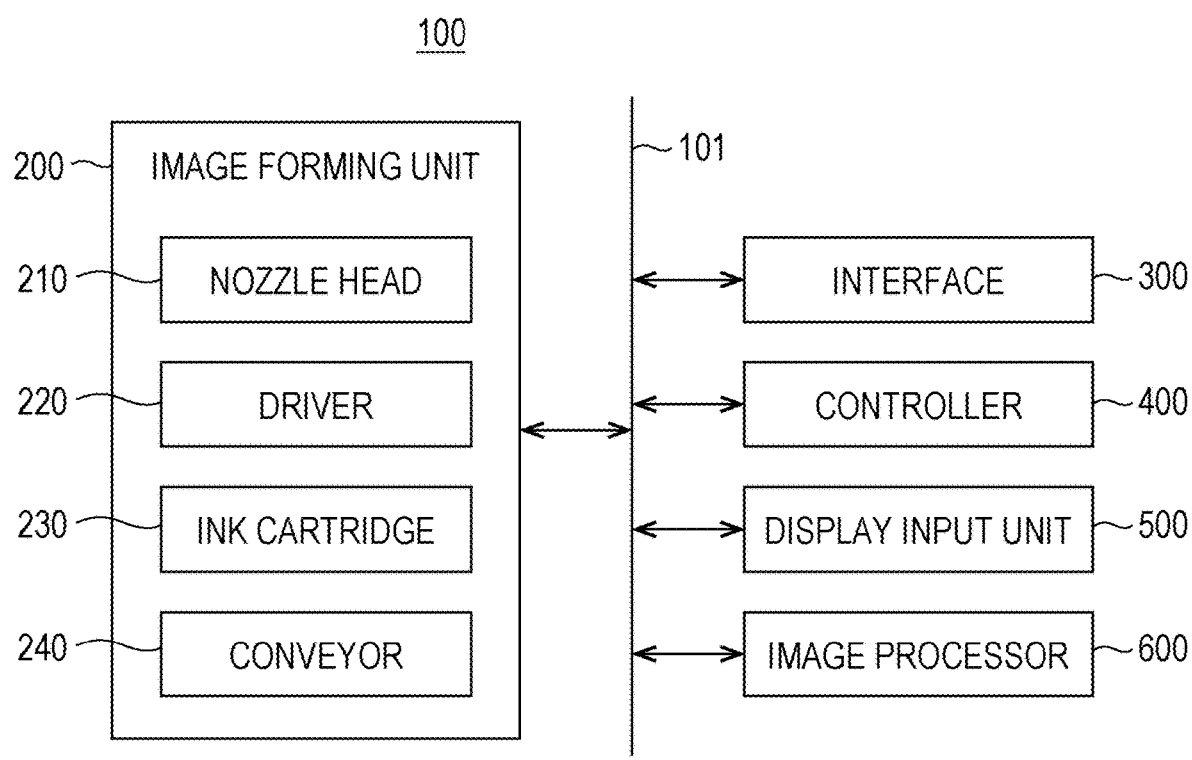
FIG. 1 is a block diagram illustrating a schematic configuration of an image forming apparatus according to one embodiment.

FIG. 1 is a block diagram illustrating a schematic configuration of an image forming apparatus 100 according to one embodiment. As illustrated in FIG. 1, the image forming apparatus 100 includes an image forming unit 200, an interface 300, a controller 400, a display input unit 500, and an image processor 600, and these components are communicably connected to each other by an internal bus 101.

The image forming unit 200 includes a nozzle head 210, a driver 220, an ink cartridge 230, and a conveyor 240.

The nozzle head 210 includes a plurality of nozzles that forms dots on paper (recording medium) by ejecting ink onto the paper. The nozzle head 210 is described later in detail.

The driver 220 drives the nozzle head 210 according to an instruction of the controller 400. The ink cartridge 230 stores ink to be ejected from the nozzles of the nozzle head 210. The conveyor 240 operates as a moving mechanism, and conveys the paper in a predetermined moving direction to move the paper in parallel to the nozzle head 210. Note that, the movement of the paper (recording medium) with respect to the nozzle head 210 may be movement of the nozzle head 210 with respect to fixed paper (recording medium). In addition to the paper, for example, fabric, a resin film, a resin plate, a metal plate and the like may also be used as the recording medium.

Note that, although not illustrated, the image forming apparatus 100 is an inkjet printer capable of forming an image using ink of a plurality of colors, and the image forming unit 200 is provided with the nozzle head 210, the driver 220, the ink cartridge 230 and the like for each of a plurality of colors.

<Nozzle Head 210>

Figure 2A:
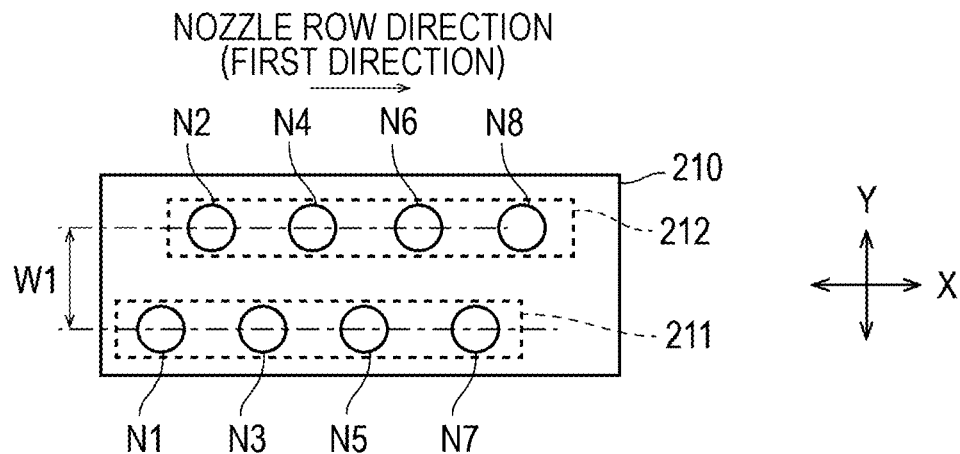
FIG. 2A is a schematic diagram for illustrating a schematic configuration of a nozzle head of an image forming unit illustrated in FIG. 1.
Figure 2B:
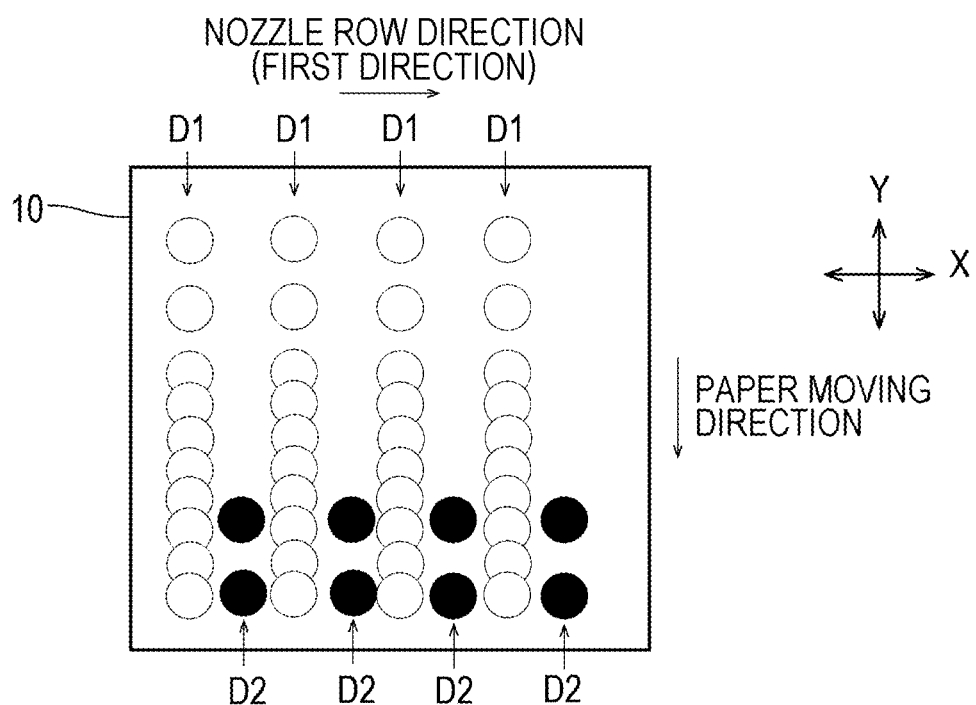
FIG. 2B is a schematic diagram for illustrating dots formed on paper by ink ejected from the nozzle head.

FIG. 2A is a schematic diagram for illustrating a schematic configuration of the nozzle head 210 of the image forming unit 200 illustrated in FIG. 1, and FIG. 2B is a schematic diagram for illustrating the dots formed on the paper by the ink ejected from the nozzle head 210.

In the following description, in one nozzle row, a direction in which a plurality of nozzles is arranged is referred to as a first direction, and a direction intersecting the first direction is referred to as a second direction. Specifically, the first direction (X direction) and the second direction (Y direction) intersecting the same are substantially orthogonal to each other. Therefore, in a single pass type in which the paper moves with respect to the nozzle head 210, the first direction is a width direction of the paper, and the second direction is the moving direction of the paper. In contrast, in a scan type in which the nozzle head 210 moves with respect to the paper, the second direction is a moving direction of the nozzle head 210. In this manner, in an inkjet type image forming apparatus, the recording medium (paper) moves relative to the nozzle head 210 in both the single pass type and the scan type.

As illustrated in FIG. 2A, the nozzle head 210 includes a plurality of nozzles and forms a dot column on the paper by ejecting the ink onto the paper. A plurality of nozzles is provided in a row in the first direction (X direction), and a plurality of nozzle rows 211 and 212 is provided in the second direction (Y direction). The second direction in which the nozzle rows 211 and 212 are arranged is the moving direction of the paper in the single pass type. In contrast, in the scan type, this is the moving direction of the nozzle head 210. Note that, in this embodiment, a single pass type image forming apparatus 100 is described as an example.

Nozzle density in the X direction of the nozzle rows 211 and 212 may be, for example, 600 dots per inch (DPI). A distance between the nozzle rows 211 and 212 is W1.

The nozzle rows 211 and 212 are arranged substantially parallel to each other, and are alternately arranged in the X direction, that is, arranged to be shifted by half a pitch of the nozzles so that positions of the nozzles do not overlap each other as seen in the Y direction. Herein, each nozzle is described with an assigned number. As illustrated in FIG. 2A, the nozzle numbers are, from a left end of the nozzle row in the drawing, No. 1 (N1), No. 2 (N2), and No. 3 (N3), . . . . In this embodiment, odd-numbered nozzles are arranged in the nozzle row 211, and even-numbered nozzles are arranged in the nozzle row 212.

By arranging the nozzle rows 211 and 212 in this manner, as illustrated in FIG. 2B, dot columns D2 by the nozzle row 212 are formed in the middle between dot columns D1 by the nozzle row 211. As a result, in the X direction, dot density becomes higher than the nozzle density of the nozzle rows 211 and 212, and resolution of the image formed on the paper 10 may be improved. Note that, the nozzle head 210 may be provided with an adjusting mechanism that adjusts a direction in which the nozzles of the nozzle rows 211 and 212 are arranged such that the direction may be adjusted to a direction desired by a user with respect to the Y direction.

The nozzle row 212 is located downstream of the nozzle row 211 by W1 in the paper moving direction in the Y direction (a direction of an arrow in the paper moving direction illustrated in FIG. 2B is an upstream direction). Therefore, the controller 400 controls the driver 220 so that the nozzle row 211 ejects the ink at a timing delayed by time T1 in which paper 10 is moved by W1 with respect to an ejection timing of the ink by the nozzle row 212. As a result, the dot column D1 are formed in advance in the Y direction by the nozzle row 211, and after an elapse of T1, the dot columns D2 are formed between the dot columns D1 by the nozzle row 212. As a result, formation starting positions of the dot columns D1 and D2 are aligned.

In this manner, by arranging a plurality of nozzle rows in the Y direction and arranging the nozzles so as not to overlap each other in the Y direction, further space saving may be achieved, and printing at high resolution may be implemented.

In this embodiment, since there are two nozzle rows, the dot density is twice the nozzle density, that is, 1,200 DPI. In a case where there are two nozzle rows as the nozzle rows 211 and 212, the dot columns D1 and D2 in the Y direction formed by the nozzles of the nozzle rows 211 and 212 are desirably adjacent to each other.

The ink ejected from the nozzle rows 211 and 212 adheres to the paper 10 in a form of droplets to be fixed. As a result, the dot columns D1 and D2 are formed on the paper 10. Note that, by using gel UV ink, it is possible to reduce a positional displacement when formed on the paper 10.

The interface 300 performs data transmission with an external device. The interface 300 includes, for example, a communication device such as a network interface card (NIC), and performs the data transmission with the external device through a line. The data transmission by the interface 300 may be performed in a wired/wireless manner, and may be performed under any condition (for example, a standard and the like) regarding its protocol and other connection formats.

The controller 400 is a computer provided with a central processing unit (CPU), a random access memory (RAM), a read only memory (ROM), an auxiliary storage and the like not illustrated. The controller 400 controls an operation of the image forming apparatus 100 by software processing. The auxiliary storage includes, for example, a hard disk drive (HDD), a solid state drive (SSD) and the like.

The CPU executes a program expanded in the RAM to control the operation of the image forming apparatus 100. The program is stored in advance in the ROM or the auxiliary storage. The RAM stores data expanded by processing of the CPU, data temporarily generated by the processing and the like. The ROM stores the program executed by the CPU, data and the like.

The display input unit 500 includes an input unit and an output unit. The input unit is provided with, for example, a keyboard and/or a touch panel, and is used for the user to perform various instructions (inputs) such as character input, various settings, print instruction and the like. The output unit is provided with a display, and is used to present a device configuration, print settings, an execution status of a print job and the like to the user by displaying (outputting) the same on the display.

<Image Processor 600>

Figure 3:
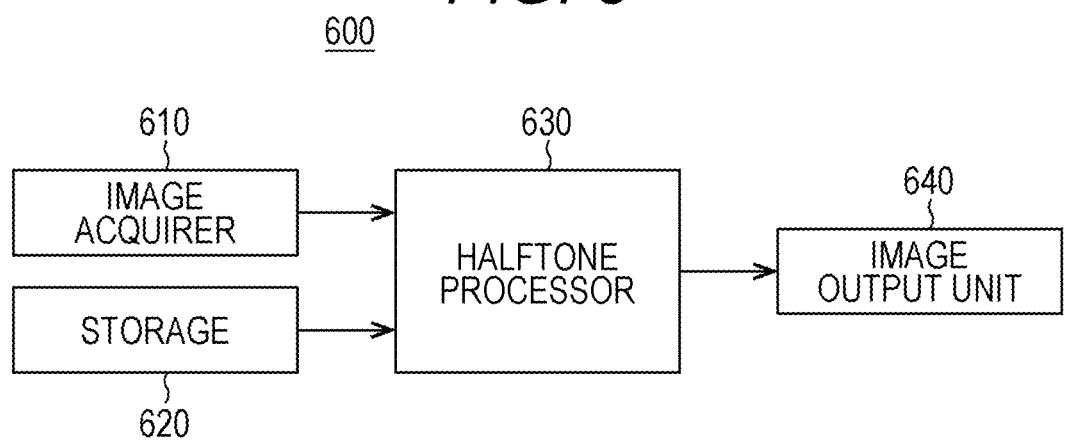
FIG. 3 is a block diagram illustrating a schematic configuration of an image processor illustrated in FIG. 1.
Figure 4:
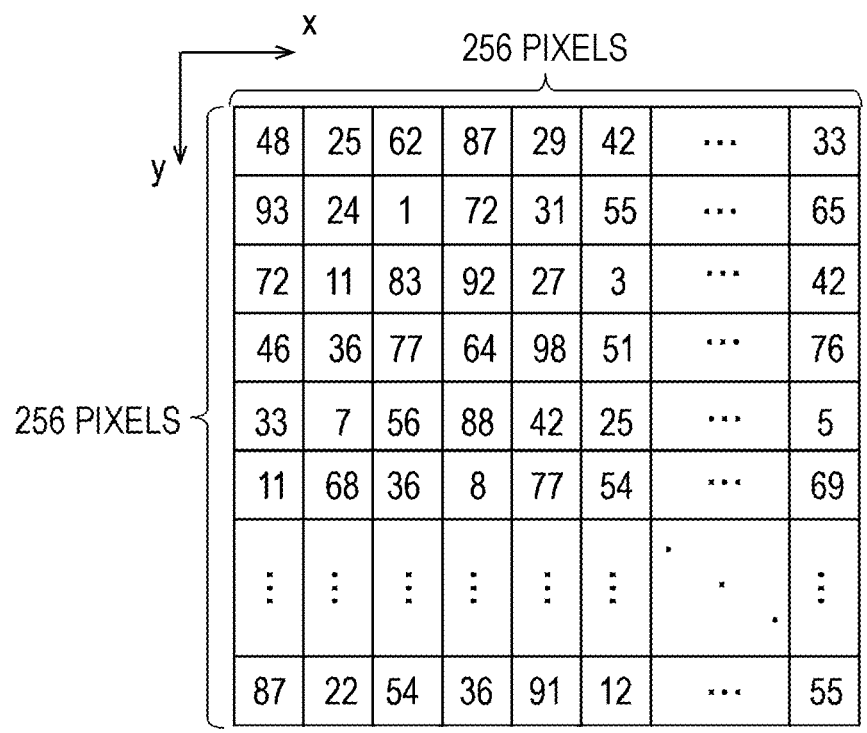
FIG. 4 is a schematic diagram illustrating an example of a threshold matrix.
Figure 5:
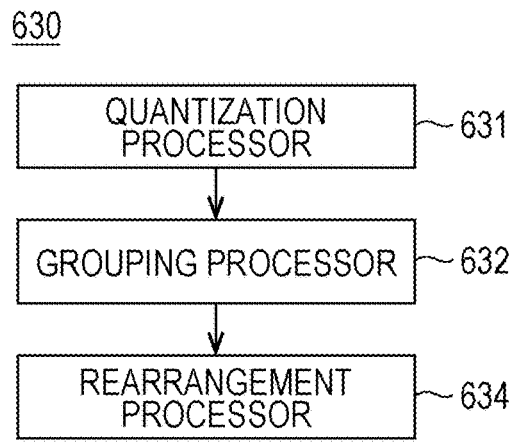
FIG. 5 is a block diagram illustrating a schematic configuration of a halftone processor illustrated in FIG. 3.

FIG. 3 is a block diagram illustrating a schematic configuration of the image processor 600 illustrated in FIG. 1, and FIG. 4 is a schematic diagram illustrating an example of a threshold matrix. FIG. 5 is a block diagram illustrating a schematic configuration of a halftone processor illustrated in FIG. 3.

The image processor 600 performs halftone processing on image data that is source data of a dot image formed on the paper 10 by the image forming unit 200. The image processor 600 includes an image acquirer 610, a storage 620, a halftone processor 630, and an image output unit 640.

The image acquirer 610 acquires the image data to which the halftone processing is to be applied and inputs the same to the halftone processor 630. The image acquirer 610 acquires, for example, the image data input from an external device via the interface 300, the image data subjected to image processing by the controller 400 and the like.

The storage 620 is a storage device that stores the threshold matrix for performing quantization processing, and is preferably formed of, for example, a non-volatile storage device such as an SSD (flash memory).

A predetermined pixel area is, for example, a pixel area of 256×256 [pixels] in an x direction along arrangement of pixels forming the image data and a y direction orthogonal to the x direction. For each pixel of the threshold matrix, a threshold corresponding to the quantization processing to be described later is set. The threshold of each pixel is the threshold for determining whether to perform dot formation for each pixel in a pixel area corresponding to the predetermined pixel area out of the pixel area forming the image data, and is set corresponding to a maximum value at the time of quantization. In a case where a quantization number is 3 (0, 1, 2), two thresholds are set, and in a case where the quantization number is 2 (0, 1), one threshold is set.

The threshold matrix illustrated in FIG. 4 is of 256×256 [pixels], but the number of thresholds of the threshold matrix, that is, the number and arrangement of pixels in the pixel area corresponding to the threshold matrix may be arbitrarily set. For example, a size of the threshold matrix may be made a size that may cover entire image data. A plurality of threshold matrices having different spatial frequencies may be stored in the storage 620 as the threshold matrix, and used by user's selection in accordance with the image data.

A plurality of pixels forming a part of or entire image data, that is, a plurality of pixels arranged in the x direction and the y direction have a one-to-one relationship with a plurality of thresholds of the threshold matrix arranged in the x direction and the y direction. Each pixel of the image data and each dot formed by a plurality of nozzles of the nozzle head 210 have a one-to-one relationship.

The halftone processor 630 may be formed of, for example, an application specific integrated circuit (ASIC) and the like. The halftone processor 630 performs the halftone processing (also referred to as quantization processing) on the image data on the basis of the image data input from the image acquirer 610 and the threshold matrix stored in the storage 620.

The halftone processing is performed on all the pixels of the image data with a size of the predetermined pixel area of the threshold matrix as one unit. For example, in a case where the pixel area of the image data has a pixel area larger than the predetermined pixel area (for example, 256×256 [pixels]), the image area of the image data is divided in units of predetermined pixel area, and the halftone processing is performed on each divided pixel area.

As illustrated in FIG. 5, the halftone processor 630 includes a quantization processor 631, a grouping processor 632, and a rearrangement processor 634. The quantization processor 631 performs the quantization processing on the image data acquired by the image acquirer 610 to generate quantized data. The quantization processing is described later in detail.

The grouping processor 632 groups a plurality of adjacent pixel positions of the quantized data generated by the quantization processor 631 into one group. The grouping processing is described later in detail.

The rearrangement processor 634 rearranges density of the pixel at each pixel position of the image data so as to prevent or reduce continuous formation of the dots. Herein, the density is a quantized pixel value. The rearrangement processing is described later in detail.

The image output unit 640 outputs the image data subjected to the halftone processing by the halftone processor 630. The image data output from the image output unit 640 is transmitted to the image forming unit 200 to form an image. The image data may also be stored in the storage 602, and the image may be formed later (for example, by the user instruction).

<Halftone (Quantization) Processing>

Figure 6:
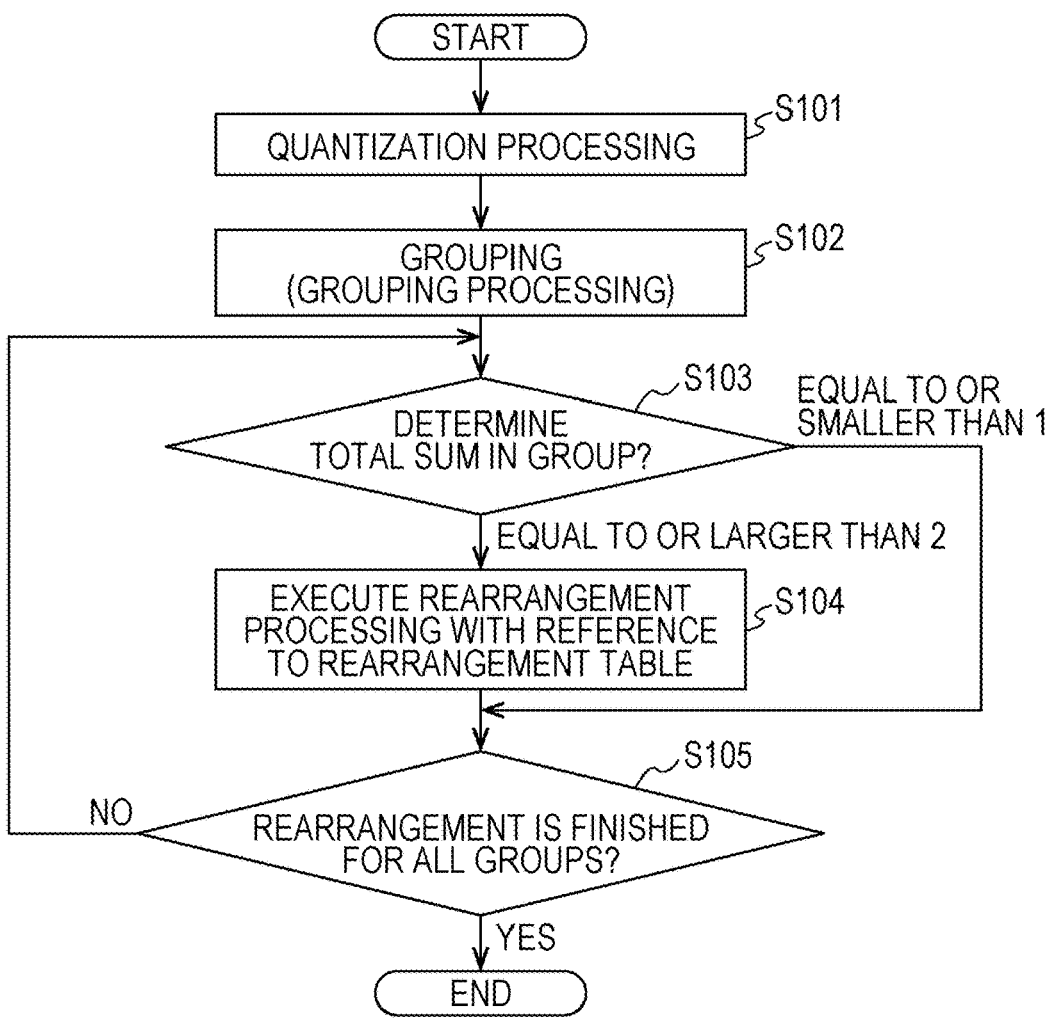
FIG. 6 is a flowchart illustrating a schematic flow of halftone processing and rearrangement processing.

FIG. 6 is a flowchart illustrating a schematic flow of the quantization processing and rearrangement processing. FIGS. 7 to 12 are schematic diagrams illustrating results of the quantization processing and rearrangement processing.

First, the quantization processor 631 performs the quantization processing (S101). In the quantization processing, a value (for example, 0 to 256) of each pixel of the image data is converted into a value of Qn stages using the threshold matrix. Qn is a natural number equal to or larger than 2. In this embodiment, Qn is set to 3. Therefore, the pixel value after the quantization is any value of 0, 1, or 2.

More specifically, when the image data is input from the image acquirer 610 to the quantization processor 631, the latter reads the threshold matrix from the storage 620. Subsequently, the quantization processor 631 compares the pixel value of each pixel in a range of the predetermined pixel area (for example, 256×256 [pixels]) out of the pixel area of the image data with the threshold of each pixel set in the threshold matrix, and performs the quantization.

In this embodiment, since Qn is set to 3, two thresholds are set for one pixel. For example, in a case where 86 and 172 are set as the thresholds for a certain pixel, the quantization processor 631 first compares the pixel value of the pixel corresponding to the threshold matrix of the image data with the threshold 86, and sets the pixel value after the quantization to 0 in a case where the pixel value of the image data is smaller than 86. In a case where the pixel value of the image data is equal to or larger than 86, the quantization processor 631 compares the pixel value of the pixel corresponding to the threshold matrix of the image data with the threshold 172, and in a case where the pixel value of the image data is smaller than 172, the pixel value after the quantization is set to 1, and in a case where the pixel value of the image data is equal to or larger than 172, the pixel value after the quantization is set to 2.

FIG. 7 illustrates an example of the pixel value after the quantization. As illustrated in FIG. 7, the pixel value of each pixel after the quantization is a value of 0 to 2. Note that, although FIG. 7 illustrates eight pixels in the first direction and four pixels in the second direction, the quantization is actually performed by the number of pixels with which the image is formed. In the drawing, c1 to c4 represent row numbers. Directions of arrows in the first direction and the second direction illustrated in the drawing are directions in which a plurality of pixels is arranged, and the first direction is a row, and the direction in which the rows are arranged is the second direction. The same applies to other drawings.

Next, the grouping processor 632 performs grouping (grouping processing) (S102). At the time of grouping, the grouping processor 632 first performs pre-grouping. In the pre-grouping, in the matrix in which the first direction is the row and the rows are arranged in the second direction, at the time of grouping, grouping starting positions of (m×(n−1)+1)-th to (m×n)-th rows are set to (n mod m+1)-th pixels (wherein m is a natural number equal to or larger than 2, n is a natural number, and a maximum value of n is obtained by the total number of rows÷m in a case where the total number of rows is divided by m, and obtained by the total number of rows÷m+1 in a case where the total number of rows cannot be divided by m). Preferably, in the matrix in which the first direction is the row and the rows are arranged in the second direction, at the time of grouping, the grouping starting positions of (2n−1)-th and (2n)-th rows are set to (n mod 2+1)-th pixels (wherein n is a natural number, and a maximum value of n is obtained by the total number of rows÷2 in a case where the total number of rows is divided by 2, and obtained by the total number of rows÷2+1 in a case where the total number of rows cannot be divided by 2).

FIG. 8 illustrates a state after this pre-grouping. In this embodiment, m is set to 2. Therefore, the grouping processor 632 groups 2×2 four pixels into one pre-group 800 (bold line in the drawing), and performs the grouping such that a third row c3 and a fourth row c4 are shifted from a first row c1 and a second row c2 by one pixel in the first direction. FIG. 9 illustrates a state after the pre-grouping in a range wider than that in FIG. 8. As illustrated in FIG. 9, in this embodiment, this pre-grouping is performed every eight pixels in the second direction. A size of the pre-group is not limited to four pixel units. However, the size of the pre-group is preferably a quadrangular block in which the same number of pixels are arranged both vertically and horizontally because it is easy to perform calculation.

Thereafter, the grouping processor 632 subdivides the pre-group 800 as grouping. FIG. 10 illustrates the group after the subdivision. In this embodiment, it is subdivided by making pixel positions of two pixels in the first direction one pair. Therefore, the grouping processor 632 groups two pixels in the first direction into one pair group 801.

In this manner, this embodiment may arbitrarily determine a direction of the group 801 by temporarily dividing into a large pre-group and subdividing the same to group, and may quickly perform subdivision processing.

Note that, the grouping processing may be performed in one stage. In a case where the grouping processing is performed in one stage, the grouping processor 632 creates a pair of two pixels in the first direction, and performs grouping so as to shift the third row c3 and the fourth row c4 by one pixel in the first direction with respect to the first row c1 and the second row c2. The same applies to the other rows, and the grouping processor 632 groups every two rows by shifting by one pixel in the first direction.

Next, the rearrangement processor 634 compares the total sum of the pixel values in the group 801 with an arbitrary value, and determines whether to perform rearrangement (S103). The arbitrary value is a natural number. At S103, the rearrangement processor 634 determines not to perform rearrangement when the total sum is equal to or smaller than 1, and determines to perform rearrangement when the total sum is equal to or larger than 2. In a case of not rearranging, it shifts to step S105. Note that, in this procedure, the determination based on the total sum (S103) and the rearrangement (S104) are executed for each group.

FIG. 11 illustrates the total sum for each group. As illustrated in FIG. 11, the rearrangement processor 634 executes the rearrangement processing on a group 802 having the total sum equal to or larger than 2 with reference to a rearrangement table (S104). The group having the total sum of 1, that is, the group having the pixel values of (1,0) or (0,1) often appears in a low density portion. If the low density portion is rearranged, graininess of the low density portion deteriorates in a printed image. Therefore, in this embodiment, such low concentration portion is not rearranged to avoid the deterioration in granulation of the low concentration portion. Note that, the rearrangement is described later in detail.

Subsequently, the rearrangement processor 634 determines whether the determination based on the total sum (S103) and the rearrangement (S104) are finished for all the groups (S105). When the determination based on the total sum (S103) and the rearrangement (S104) are not finished in all the groups, it returns to step S103 and the processing continued. In contrast, if they are finished, the processing according to this procedure ends (end).

<Rearrangement Processing>

The rearrangement processing is executed using a rearrangement pattern stored in advance in the storage 620.

The rearrangement processor 634 replaces a group 801a (refer to FIG. 10) of (1,1) at the time of total sum calculation with (0,2) or (2,0) such that only one pixel position has the pixel value 2. It is determined in advance which pixel position is replaced to be stored in the storage 62. In this manner, by replacing 1 dpd×2 with 2 dpd, occurrence of image failure due to a shift of landing position may be prevented or reduced.

Subsequently, the rearrangement processor 634 executes the rearrangement with reference to the rearrangement pattern. FIG. 12 illustrates the pixel values after the rearrangement. FIG. 13 is a schematic diagram illustrating an example of the rearrangement pattern. The rearrangement pattern is a pattern in which "YES" with which the pixel value is rearranged and "NO" with which the pixel value is not rearranged are indicated for each group. In this embodiment, since the rearrangement is performed using the rearrangement pattern, the rearrangement may be processed quickly as compared with a case where it is sequentially calculated for each pixel.

Note that, the rearrangement pattern may be indicated in units of four pixels as the pre-group. FIG. 14 is a schematic diagram illustrating another example of the rearrangement pattern. This example illustrates the rearrangement pattern in units of four pixels. In a case where the rearrangement pattern is indicated in units of four pixels, the rearrangement processor 634 distributes the pixel values in the four pixels such that four pixels have this pixel value.

The rearrangement pattern is determined in advance and stored in the storage 620. The rearrangement pattern is determined on the basis of, for example, a dither pattern and the like (to be described later in detail).

The rearrangement processor 634 executes the rearrangement with reference to the rearrangement pattern illustrated in FIG. 13 for the group having the total sum equal to or larger than 2. After the rearrangement, the pixel values are exchanged in a group 803 as illustrated in FIG. 12.

A direction of the rearrangement is determined as a parameter separately from the rearrangement pattern. In this embodiment, the direction of the rearrangement is in the first direction, that is, it is exchanged in a paired group. Such direction of the rearrangement is stored in the storage 620 as the parameter. Therefore, as the rearrangement pattern, it is only defined whether to perform rearrangement as illustrated in FIG. 13. The direction of the rearrangement is not limited thereto. The direction of the rearrangement may be, for example, the second direction. In a case where all the rearrangement directions are in the same direction, a data amount of the rearrangement pattern may be reduced by storing the same in the storage 620 as a parameter for determining the direction.

Note that, the direction of the rearrangement may be embedded in the rearrangement pattern in advance. By embedding the direction of the rearrangement in the rearrangement pattern, the direction of the rearrangement may be set to the first direction or the second direction in units of group (including pre-group) on the basis of the rearrangement pattern, or may be freely distributed in the image data.

<Action>

Figure 15:
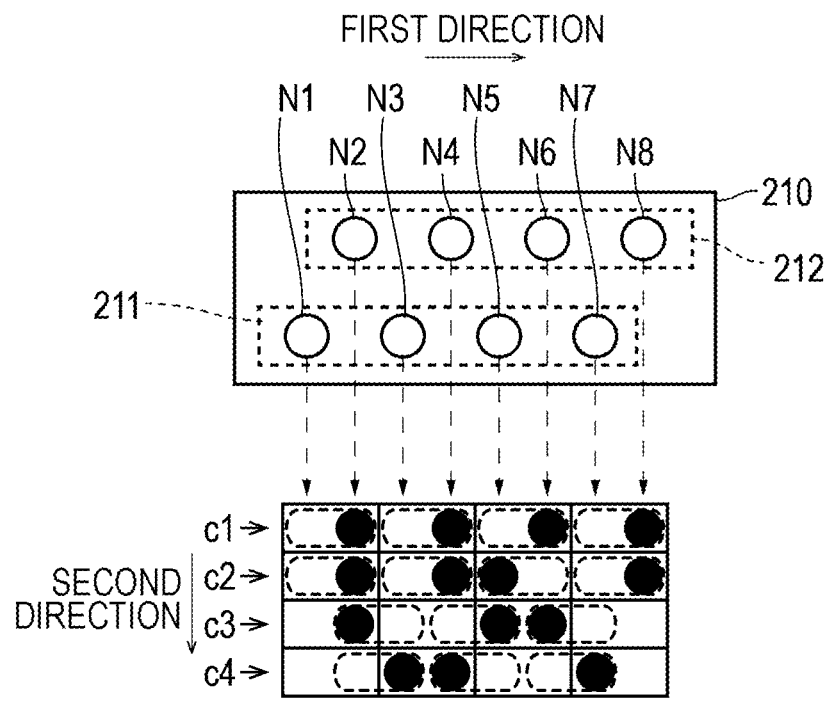
FIG. 15 is a schematic diagram illustrating an inclination of the nozzle head and ink landing positions on paper in the embodiment.
Figure 16:
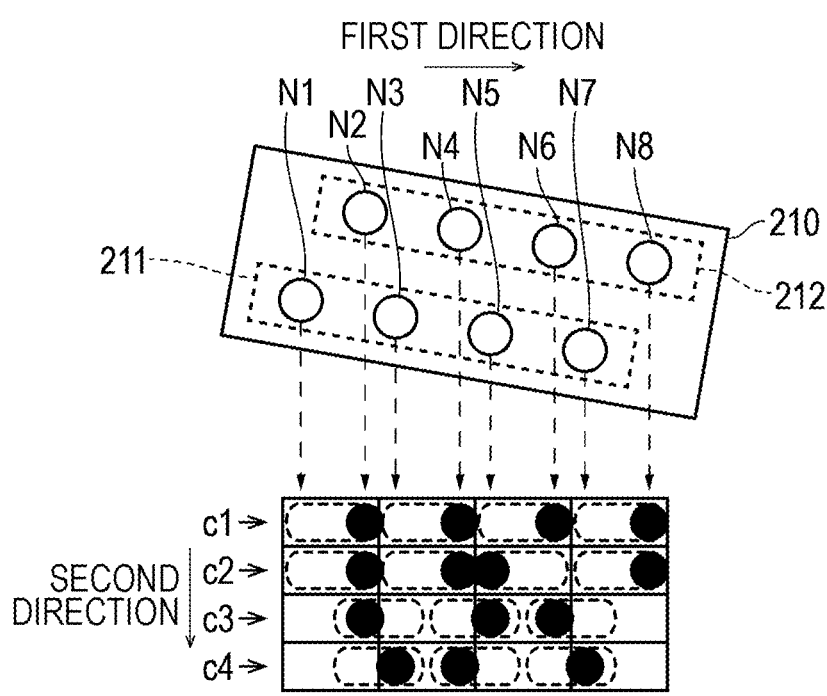
FIG. 16 is a schematic diagram illustrating an inclination of a nozzle head and ink landing positions on paper in the embodiment.
Figure 17:
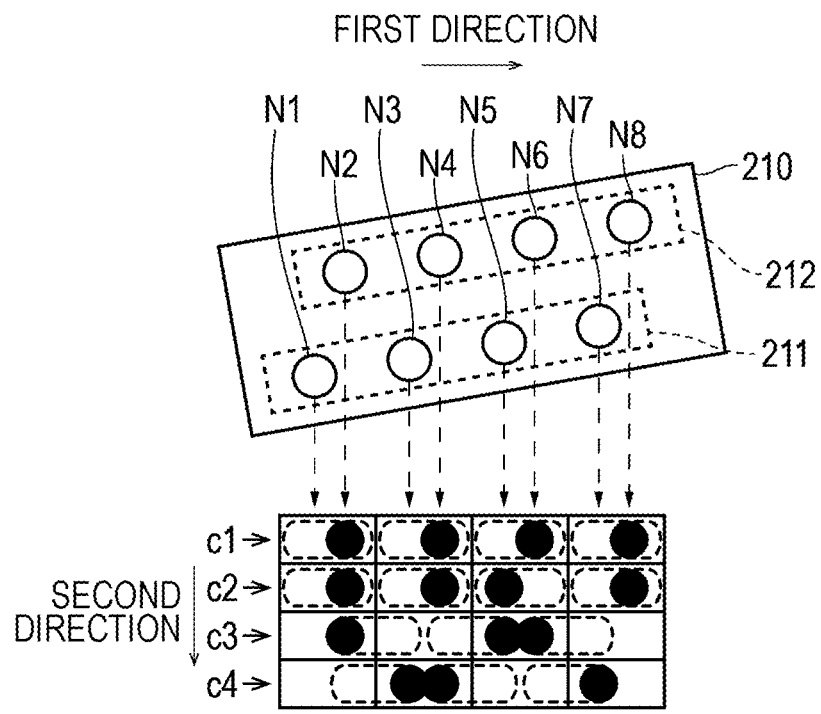
FIG. 17 is a schematic diagram illustrating an inclination of the nozzle head and ink landing positions on paper in the embodiment.

FIGS. 15 to 17 are schematic diagrams illustrating an inclination of the nozzle head 210 and ink landing positions on the paper in this embodiment.

FIG. 15 illustrates a state in which there is almost no inclination of the nozzle head 210. The inclination of the nozzle head is an inclination with respect to the first direction (X direction) (the same applies hereinafter). At that time, the landing positions of the ink droplets after the rearrangement are ideal.

FIG. 16 illustrates a case where the nozzle head 210 is inclined in a direction in which a left side rises as illustrated in the drawing. At that time, as compared with normal positions illustrated in FIG. 15, in the landing positions of the ink droplets after the rearrangement, nozzle numbers N4 and N5 are close to each other in the second row c2. In contrast, there is no such proximity between the even number and odd number in the third row c3 and the fourth row c4.

FIG. 17 illustrates a case where the nozzle head 210 is inclined in a direction in which a right side rises as illustrated in the drawing. At that time, as compared with the normal positions illustrated in FIG. 15, in the landing positions of the ink droplets after the rearrangement, nozzle numbers N3 and N4 are close to each other in the third row c3 and nozzle numbers N5 and N6 are close to each other in the fourth row c4. That is, the ink landing positions from the odd-numbered and even-numbered nozzles are close to each other in the third row c3 and the fourth row c4. In contrast, there is no such proximity between the odd number and even number in the first row c1 and the second row c2.

In this manner, in this embodiment, when the pixel positions are grouped, an initial position of the grouping is shifted every two rows. As a result, in this embodiment, possibility that the ink landing positions are close to each other between the odd number and even number or between the even number and odd number in a case where the nozzle head is inclined may be reduced.

Therefore, in this embodiment, even in a case where the nozzle head is inclined, it is possible to prevent or reduce a phenomenon that the image is partially dense or pale or occurrence of density unevenness due to density variation in the image in the image formation after the rearrangement. Therefore, in this embodiment, even in a case where the nozzle head is inclined, a difference between dot arrangement in the image data after the halftone processing and dot arrangement actually formed on the paper is reduced, and the dot arrangement may be made as expected by the user.

Comparative Example

Herein, as a comparative example, an ink landing position in a case where this embodiment is not applied is described. In the comparative example, an initial position of each group is the same in all rows.

Figure 18:
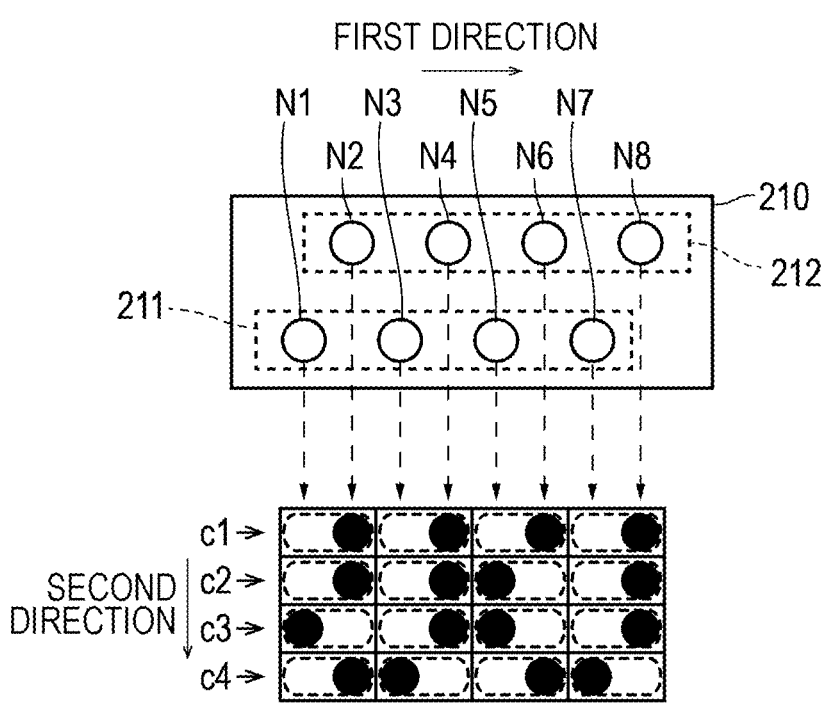
FIG. 18 is a schematic diagram illustrating an inclination of a nozzle head and ink landing positions on paper in a comparative example.
Figure 19:
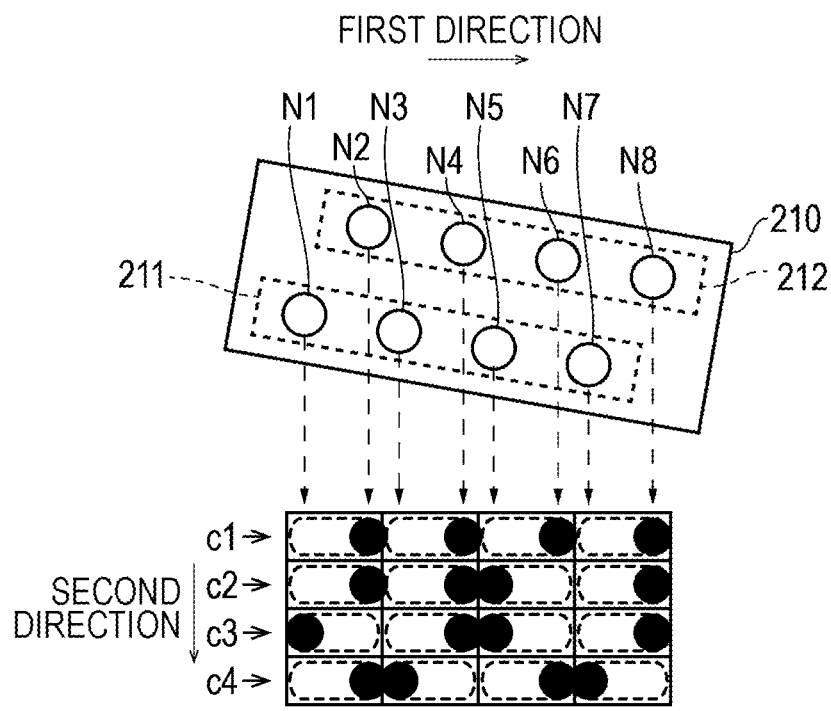
FIG. 19 is a schematic diagram illustrating an inclination of a nozzle head and ink landing positions on paper in the comparative example.
Figure 20:
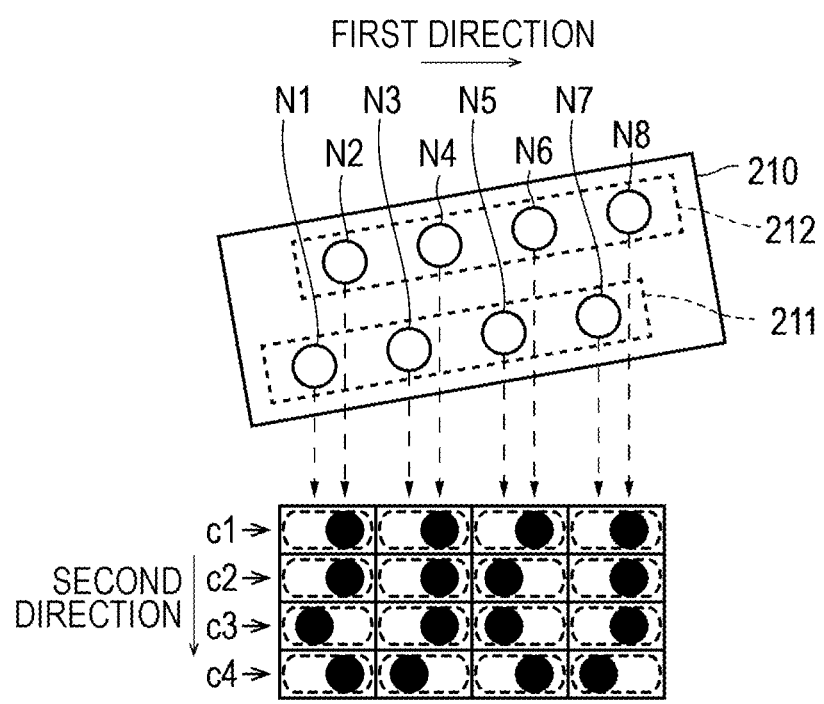
FIG. 20 is a schematic diagram illustrating an inclination of a nozzle head and ink landing positions on paper in the comparative example.

FIGS. 18 to 20 are schematic diagrams illustrating an inclination of a nozzle head 210 and ink landing positions on paper in the comparative example.

FIG. 18 illustrates a state in which there is almost no inclination of the nozzle head 210. At that time, the landing positions of the ink droplets after the rearrangement are ideal.

FIG. 19 illustrates a case where the nozzle head 210 is inclined in a direction in which a left side rises as illustrated in the drawing. At that time, as compared with normal positions illustrated in FIG. 18, in the landing positions of the ink droplets after the rearrangement, nozzle numbers N4 and N5 are close to each other in second and third rows c2 and c3 and nozzle numbers N2 and N3 and nozzle numbers N6 and N7 are close to each other in a fourth row c4. That is, the ink landing positions from odd-numbered and even-numbered nozzles are close to each other in many rows in the comparative example.

FIG. 20 illustrates a case where the nozzle head 210 is inclined in a direction in which a right side rises as illustrated in the drawing. At that time, as compared with the normal positions illustrated in FIG. 18, in the landing positions of the ink droplets after the rearrangement, the nozzle numbers N4 and N5 are separated from each other in the second and third rows c2 and c3 and the nozzle numbers N2 and N3 and the nozzle numbers N6 and N7 are separated from each other in the fourth row c4. That is, the ink landing positions from the even-numbered and odd-numbered nozzles are separated from each other in many rows in the comparative example.

Figure 21:
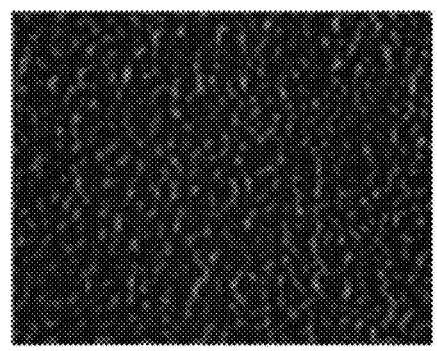
FIG. 21 is a drawing-substituting photograph illustrating an image example in a case where the ink landing positions are close to each other in the comparative example.
Figure 22:
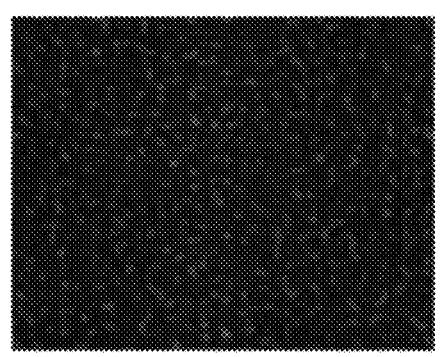
FIG. 22 is a drawing-substituting photograph illustrating an image example in a case where the ink landing positions are separated from each other in the comparative example.

FIG. 21 is a drawing-substituting photograph illustrating an image example in a case where the ink landing positions are close to each other as illustrated in FIG. 19 in the comparative example. FIG. 22 is a drawing-substituting photograph illustrating an image example in a case where the ink landing positions are separated from each other as illustrated in FIG. 20 in the comparative example.

In the comparative example, in a case where the nozzle head is inclined, when the number of ink landing positions close to each other between the odd number and even number increases, a dense portion and a pale portion of the image are emphasized as illustrated in FIG. 21. On the contrary, when the number of ink landing positions separated from each other between the odd number and even number increases, an entire image becomes pale and flat as illustrated in FIG. 22. Furthermore, since an inclination angle is different, a difference in density between FIGS. 21 and 22 increases in the comparative example.

In this manner, in the comparative example, in a case where the nozzle head is inclined, the image is partially dense or pale in the image formation after the rearrangement. Therefore, in the comparative example, dot arrangement is not as expected by a user.

As described above, a ratio of proximity or separation of the ink landing positions between the odd number and even number may be reduced in this embodiment, so that the image is not with large density variation as in the comparative example.

<Determination of Rearrangement Pattern>

A method of determining the rearrangement pattern is described.

The rearrangement pattern is determined using, for example, a predetermined dither pattern as described above.

At that time, the rearrangement pattern is such that, after the rearrangement, in the first direction, a ratio between the number of occurrences of adjacent odd-numbered and even-numbered pixels having a pixel value equal to or larger than 1 and the number of occurrences of adjacent even-numbered and odd-numbered pixels is between 0.8 and 1.2.

Figure 23:
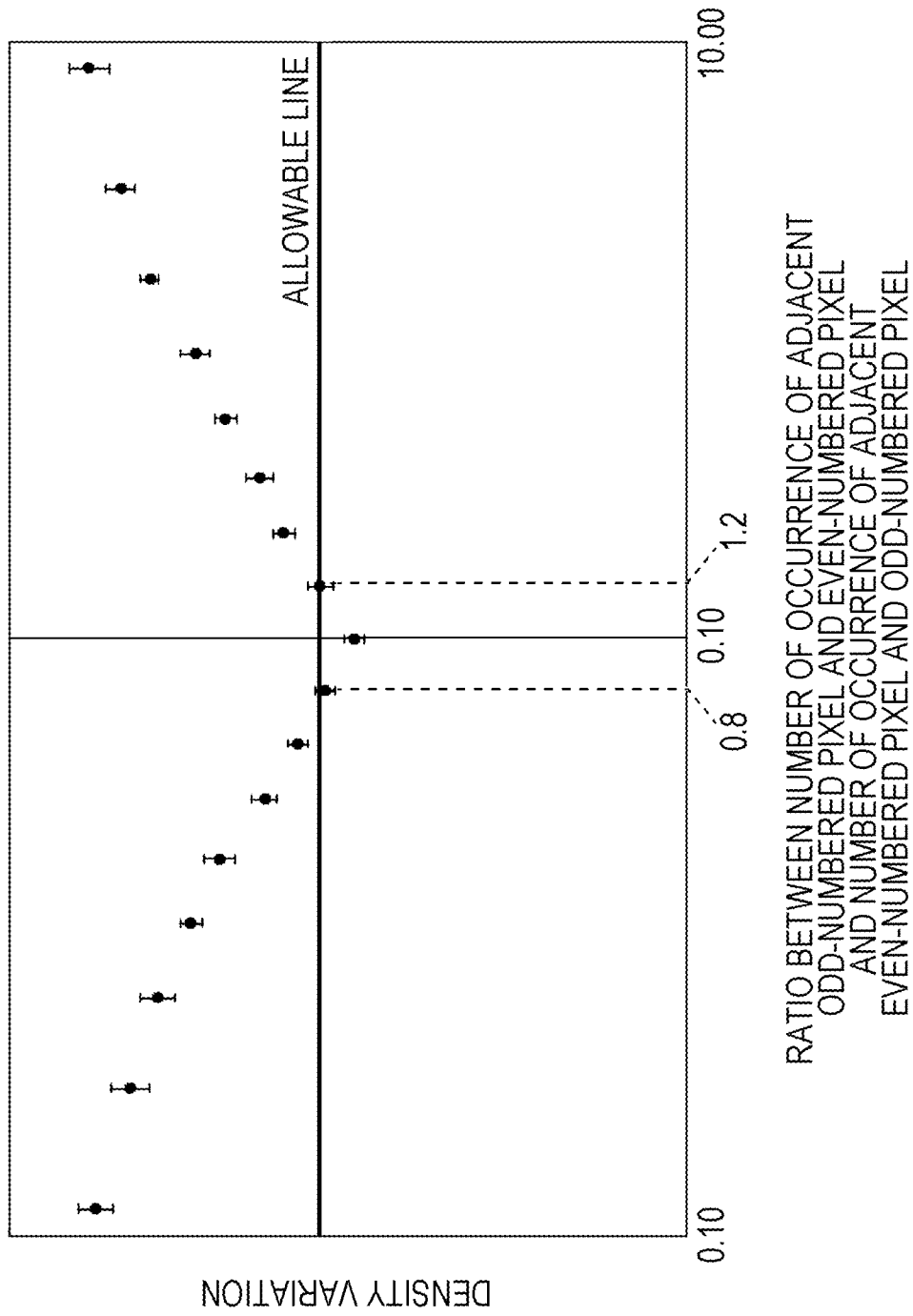
FIG. 23 is a graph illustrating a ratio between the number of occurrences of adjacent odd-numbered and even-numbered pixels having a pixel value equal to or larger than 1 and the number of occurrences of adjacent even-numbered and odd-numbered pixels.

FIG. 23 is a graph illustrating the ratio between the number of occurrences of adjacent odd-numbered and even-numbered pixels having a pixel value equal to or larger than 1 and the number of occurrences of adjacent even-numbered and odd-numbered pixels. This graph is a result of creating the rearrangement pattern using various dither patterns and simulating the pixel positions after the rearrangement.

As a result of the simulation, as illustrated in FIG. 23, the density variation increases regardless of whether the ratio of the number of occurrences of adjacent odd-numbered and even-numbered pixels and the number of occurrences of adjacent even-numbered and odd-numbered pixels is lower or higher. Therefore, the rearrangement pattern between 0.8 to 1.2 is preferable. By setting to such a value, the occurrence of density unevenness may be suppressed.

Although not illustrated, an embodiment may further be provided with an edge detector that detects an edge formed on the basis of a difference in pixel value between a plurality of pixels forming the image data. In the embodiment, the rearrangement processing is not performed on the detected edge. When the pixels in the edge are rearranged and moved, the dots that should originally be in the edge are not printed at the time of printing, and thus the edge rattles. In the embodiment, the edge detector is provided, and in a case where there is the pixel value equal to or larger than 1 in the edge, the pixel does not move. As a result, in the embodiment, it is possible to prevent the edge from rattling after the rearrangement The present invention is not limited to the above-described embodiment, and various modifications may be made within the scope of claims.

Although the single pass type has been described as an example of the image forming apparatus 100 according to the above-described embodiment, the present invention is similarly applicable to the scan type.

Means for performing various types of processing and the image forming method in the image forming apparatus 100 according to the above-described embodiment may be implemented by any of a dedicated hardware circuit or a computer that executes an image forming program. The above-described program may be provided by a computer-readable recording medium such as a compact disc-read only memory (CD-ROM), or may be provided online via a network such as the Internet. In this case, the program recorded on the computer-readable recording medium is usually transferred to a storage such as a hard disk to be stored. The above-described program may be provided as single application software, or may be incorporated, as a function of the image forming apparatus 100, into software of the apparatus.

According to an embodiment of the present invention, when a plurality of pixel positions is grouped as a group after density of each pixel is quantized, initial positions of a plurality of groups arranged in a first direction are different by at least one pixel in a second direction. As a result, the present invention may prevent or reduce variation in image density while avoiding an increase in size and cost of the nozzle head.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
   a nozzle head in which a plurality of nozzles that ejects ink is arranged in a first direction;
   a moving mechanism that moves a recording medium relative to the nozzle head;
   an image acquirer that acquires image data;
   a quantization processor that quantizes density of pixels forming an image on a basis of the image data;
   a grouping processor that groups a plurality of adjacent pixel positions into one group in the data that is quantized; and
   a rearrangement processor that rearranges a quantized pixel value at each pixel position in the group that is grouped, wherein
   the grouping processor
   groups such that a direction intersecting the first direction is set to a second direction, arrangement of a plurality of groups in the first direction is set to a row, a plurality of rows is arranged in the second direction, and a row in which an initial position of the row is different at least by one pixel is included.

2. The image forming apparatus according to claim 1, wherein the grouping processor sets a grouping starting position of (m×(n−1)+1)-th to (m×n)-th rows to a (n mod m+1)-th pixel (wherein m is a natural number equal to or larger than 2, n is a natural number, and a maximum value of n is obtained by a total number of rows÷m in a case where the total number of rows is divided by m, and obtained by the total number of rows÷m+1 in a case where the total number of rows is not divided by m).

3. The image forming apparatus according to claim 1, wherein the grouping processor sets a grouping starting position of (2n−1)-th and 2n-th rows to a (n mod 2+1)-th pixel (wherein n is a natural number, and a maximum value of n is obtained by a total number of rows÷2 in a case where the total number of rows is divided by 2, and obtained by the total number of rows÷2+1 in a case where the total number of rows is not divided by 2).

4. The image forming apparatus according to claim 1, wherein the grouping processor divides a plurality of adjacent pixel positions in the quantized data into a pre-group including two or more pixels, and makes pixel positions of two pixels in the first direction or the second direction in the pre-group the group as a pair.

5. The image forming apparatus according to claim 1, wherein, in a case where pixel values of adjacent two pixels are (1,1), the rearrangement processor performs rearrangement after converting the pixel values to (2,0) or (0,2).

6. The image forming apparatus according to claim 1, wherein the rearrangement processor performs rearrangement in a case where a total sum of pixel values in the group is equal to or larger than an arbitrary value.

7. The image forming apparatus according to claim 1, wherein the rearrangement processor determines a rearrangement direction to at least any one of the first direction and the second direction on a basis of an arbitrary rearrangement pattern.

8. The image forming apparatus according to claim 1, wherein the rearrangement processor determines whether to perform rearrangement on a basis of an arbitrary rearrangement pattern.

9. The image forming apparatus according to claim 8, comprising:

a storage that stores which of the first direction or the second direction a rearrangement direction is, wherein the rearrangement processor performs rearrangement processing according to the rearrangement direction stored in the storage.

10. The image forming apparatus according to claim 1, wherein the rearrangement processor refers to a plurality of threshold matrices having different spatial frequencies, and determines whether to perform rearrangement on a basis of a threshold of the threshold matrices.

11. The image forming apparatus according to claim 1, further comprising:

an edge detector that detects an edge formed on a basis of a difference between pixel values of a plurality of pixels forming the image data, wherein the rearrangement processor does not perform rearrangement for a portion detected as the edge.

12. The image forming apparatus according to claim 1, wherein the rearrangement processor performs rearrangement such that, in the first direction, a ratio between a number of occurrences of adjacent odd-numbered and even-numbered pixels having a pixel value equal to or larger than 1 and a number of occurrences of adjacent even-numbered and odd-numbered pixels is between 0.8 and 1.2.

13. The image forming apparatus according to claim 1, wherein in the nozzle head, a plurality of nozzle rows in each of which the plurality of nozzles is arranged in a row is arranged in parallel to each other.

14. The image forming apparatus according to claim 1, wherein the ink is fixed after being adhered to the recording medium in a droplet state.

15. An image forming method in an image forming apparatus including:

a nozzle head in which a plurality of nozzles that ejects ink is arranged in a first direction; and a moving mechanism that moves a recording medium relative to the nozzle head, the image forming method comprising:

quantizing density of pixels forming an image on a basis of image data;

grouping a plurality of adjacent pixel positions into one group in the data that is quantized; and rearranging a quantized pixel value at each pixel position in the group that is grouped, wherein the grouping groups such that a direction intersecting the first direction is set to a second direction, arrangement of a plurality of groups in the first direction is set to a row, a plurality of rows is arranged in the second direction, and a row in which an initial position of the row is different at least by one pixel is included.

16. The image forming method according to claim 15, wherein the grouping sets a grouping starting position of (m× (n−1)+1)-th to (m× n)-th rows to a (n mod m+1)-th pixel (wherein m is a natural number equal to or larger than 2, n is a natural number, and a maximum value of n is obtained by a total number of rows÷m in a case where the total number of rows is divided by m, and obtained by the total number of rows÷m+1 in a case where the total number of rows is not divided by m).

17. The image forming method according to claim 15, wherein the grouping sets a grouping starting position of (2n−1)-th and 2n-th rows to a (n mod 2+1)-th pixel (wherein n is a natural number, and a maximum value of n is obtained by a total number of rows÷2 in a case where the total number of rows is divided by 2, and obtained by the total number of rows÷2+1 in a case where the total number of rows is not divided by 2).

18. The image forming method according to claim 15, wherein the grouping divides a plurality of adjacent pixel positions in the quantized data into a pre-group including two or more pixels, and makes pixel positions of two pixels in the first direction or the second direction in the pre-group the group as a pair.

19. The image forming method according to claim 15, wherein
in the nozzle head, a plurality of nozzle rows in each of which the plurality of nozzles is arranged in a row is arranged in parallel to each other.

20. A non-transitory recording medium storing a computer readable image forming program for allowing a computer to execute the image forming method according to claim 15.

\* \* \* \* \*